United States Patent [19]

Smith

[11] Patent Number: 4,780,437
[45] Date of Patent: Oct. 25, 1988

[54] FABRICATION OF CATALYTIC ELECTRODES FOR MOLTEN CARBONATE FUEL CELLS

[75] Inventor: James L. Smith, Lemont, Ill.

[73] Assignee: The United States of America as represented by the United States Department of Energy, Washington, D.C.

[21] Appl. No.: 13,472

[22] Filed: Feb. 11, 1987

[51] Int. Cl.$^4$ .......................... H01M 4/88; B22F 3/10
[52] U.S. Cl. ..................... 502/101; 264/56; 264/104; 419/2; 419/19; 419/23; 429/45; 429/221; 502/527
[58] Field of Search ................. 502/101, 527; 419/2, 419/19, 23; 264/56, 104

[56] References Cited

U.S. PATENT DOCUMENTS

| | | | |
|---|---|---|---|
| 2,928,891 | 3/1980 | Justi et al. | 502/527 |
| 3,379,570 | 4/1968 | Berger et al. | 502/527 |
| 3,395,049 | 7/1968 | Thompson | 502/527 |
| 3,533,753 | 10/1970 | Berger | 502/527 |
| 4,233,181 | 11/1980 | Goller et al. | 502/101 |
| 4,401,519 | 8/1983 | Kadija et al. | 502/101 |
| 4,404,267 | 9/1983 | Iacovangelo et al. | 429/41 |
| 4,410,607 | 10/1983 | Arons et al. | 429/40 |
| 4,411,968 | 10/1983 | Reiser et al. | 429/41 |
| 4,564,567 | 1/1986 | Kucera et al. | 429/41 |
| 4,714,586 | 12/1987 | Swarr et al. | 419/2 |
| 4,721,513 | 1/1988 | Smith et al. | 29/823.5 |

FOREIGN PATENT DOCUMENTS 2445310 4/1976 Fed. Rep. of Germany ...... 502/101

OTHER PUBLICATIONS

"The Synthesis of Amorphous Ni-Ti Alloy Powder by Alloying," submitted to the J. of Non-Crystalline Solids; 1985; R. B. Schwarz et al.
"Preparation of Amorphous $Ni_{60}Nb_{40}$ by Mechanical Alloying," C. C. Koch et al., Appl. Phys. Lelt., 43(11), Dec. 1, 1983.

Primary Examiner—Paul E. Konopka
Attorney, Agent, or Firm—Hugh W. Glenn; Robert J. Fisher; Judson R. Hightower

[57] ABSTRACT

A porous layer of catalyst material suitable for use as an electrode in a molten carbonate fuel cell includes elongated pores substantially extending across the layer thickness. The catalyst layer is prepared by depositing particulate catalyst material into polymeric flocking on a substrate surface by a procedure such as tape casting. The loaded substrate is heated in a series of steps with rising temperatures to set the tape, thermally decompose the substrate with flocking and sinter bond the catalyst particles into a porous catalytic layer with elongated pores across its thickness. Employed as an electrode, the elongated pores provide distribution of reactant gas into contact with catalyst particles wetted by molten electrolyte.

13 Claims, 1 Drawing Sheet

FABRICATION OF CATALYTIC ELECTRODES FOR MOLTEN CARBONATE FUEL CELLS

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to an improved method of preparing catalytic layers, particularly layers for electrode use within fuel cells. Of particular importance are electrodes for use in the molten carbonate electrolyte fuel cells in which fuel and oxidant gases are distributed throughout separate electrodes into contact with the electrolyte. The electrolyte is provided in a porous tile or matrix generally disposed between electrode pairs.

Representative methods and materials for preparing electrodes in molten carbonate fuel cells are disclosed in U.S. Pat. Nos. 4,564,567 to Kucera et al., 4,410,607 to Arons et al and U.S. patent application Ser. No. 823,718, filed Jan. 29, 1986, now U.S. Pat. No. 4,714,586 by Swarr et al. Typically, molten carbonate fuel cells include anodes of such as porous nickel and cathodes of porous lithiated nickel oxides or other transition metal oxides possibly combined as oxygenates with lithium, i.e., $LiFeO_2$ and $Li_2MnO_3$. A representative electrolyte can include a mixture of $Li_2CO_3$ and $K_2CO_3$.

Previous electrode preparation techniques have involved various metallurgical methods. Particulate transition metals and transition metal oxides have been formed into porous plaques by compaction and sintering techniques. Porous metal plaques have been oxidized both within and outside the fuel cell environment in the preparation of electrodes.

Attempts to control porosity have involved compaction and sintering control as well as the use of decomposable material. Arons et al., cited above discloses the use of a decomposable binder to provide both fine and coarse porosity within a fuel cell electrode. Even with such attempts, the distribution of reactant gases has not obtained the desired uniformity throughout the electrode.

SUMMARY OF THE INVENTION

In view of the above it is an object of the present invention to provide an improved method of preparing a porous catalytic layer.

It is a further object to provide a method of preparing a fuel cell electrode with its porosity of large pore size aligned along the electrode thickness.

It is a further object to provide a fuel cell electrode with uniformly aligned porosity for good distribution of reactant gas.

These and other objects of the invention are provided by forming a porous catalytic layer having elongated pores. Such layer is formed by providing a substrate of heat consumable material with flocking on an exposed surface and depositing particulate catalyst into the flocking followed by heating the substrate and catalyst to a temperature sufficient to consume the flocking leaving a porous catalytic layer with pores in general alignment along the layer thickness.

In one manner of providing flocking on the substrate, an adhesive is applied to a substrate layer and flocking fibers are applied in a generally normal alignment to the substrate. The fibers can be aligned electrostatically, with blowers or with other known techniques for providing flocking fibers on the substrate surface.

In other specific aspects of the invention, the substrate, flocking and adhesive each consist of thermally consumable organic material that leaves minimal solid residue. Particular polymeric and other organic materials include nylon, polyesters, cellulose, acetates, rayon, and cotton. The substrate, adhesive, and flocking can be of different organic materials but each are selected to thermally decompose or burn at temperatures less than the melting temperature of the catalysts. Typically, the materials are selected to be consumed at temperatures in excess of 200° C. but below the catalyst's melting temperature, so as to leave substantially no solid residue.

In other specific aspects of the invention, particulate catalyst is dispersed into a volatile liquid to form a slip and the slip is cast as a tape onto the substrate flocking. A heat comsumable binder and plasticizer can be included in the slip.

In one other aspect of the invention, the heating step is carried out at a first temperature to volatilize the slip liquid and set the tape within the flocking. Next heating is carried out to a second temperature sufficient to decompose or burn the substrate with flocking. Finally, the layer is heated to a third temperature sufficient to sinter the catalyst into an integral porous layer with elongated pores generally aligned along the layer thickness and fine, randomly distributed pores determined by the catalyst particle size and shape.

The invention also comtemplates an electrode for use in a molten carbonate fuel cell. The electrode includes a layer of catalytic material having elongated pores generally aligned along the thickness thereof.

Specific aspects of the electrode include elongated pores of about 5 to 20 microns in diameter extending substantially across the electrode thickness of about 0.2 to 5 millimeters thick. The elongated pores are uniformly spaced throughout the length and width of the electrode surface and should be at a distribution of about 5,000 to 50,000 per centimeter square. The aligned elongated pores provide a relatively large-size porosity for the introduction of a reactant gas to the electrode catalyst.

In addition to the elongated pores, a porosity of much fiber pore size is defined by the interstitials among the catalytic particles. This interparticulate porosity is selected to permit electrolyte retention and wetting of the catalytic particles for exposure to the reactant gas introduced through the elongated pores. For this purpose, interstitials of about 0.5-1 micron width are preferred.

BRIEF DESCRIPTION OF THE DRAWING

The present invention is illustrated in the accompanying sole drawing which shows in generally schematic fashion a fuel cell incorporating electrodes in accordance with the principles of the present invention.

DETAILED DESCRIPTION OF THE PREFERRED EMBODIMENT

Figure 1:
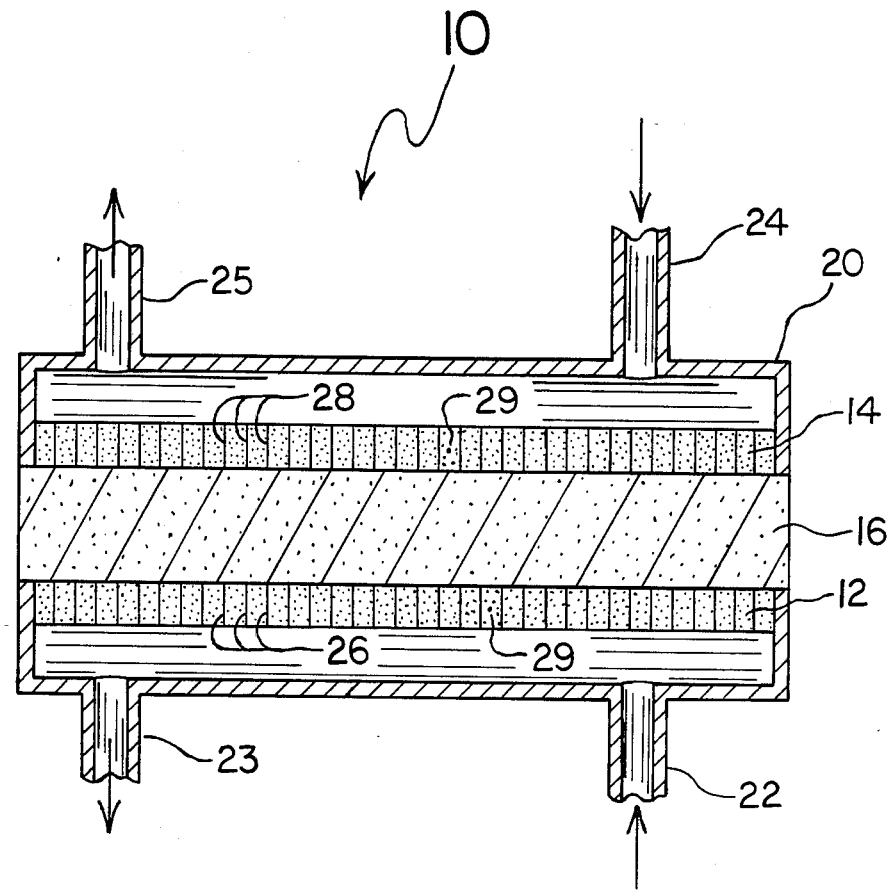

The FIGURE illustrates a fuel cell that can incorprate an electrode prepared by the method of this invention. As shown, the fuel cell 10 includes a porous cathode 12 and a porous anode 14 separated by a porous matrix 16 for containing molten carbonate electrolyte. The fuel cell components are illustrated in a housing 20 with inlets 22 and 24 for providing oxidant gas and fuel gas to the cathode and anode respectively. Outlets 23 and 25 permit withdrawal of the excess reactants and reaction products.

Both the cathode 12 and anode 14 are illustrated having elongated pores 26 and 28 extending substantially across the thickness of the respective electrode. Where desired a bubble barrier layer (not shown) can be included between the matrix 16 and one or both of the electrodes 12 and 14. The application of such a bubble barrier is shown in U.S. Pat. No. 4,411,968 to Reiser et al., incorporated by reference herein to show bubble barrier and matrix tape formation. The electrodes 12 and 14 also are illustrated with dots 29 representing a fine porosity in the interstitial spaces among the catalytic particles throughout the electrode layers.

As an example of the porosity and pore sizes in the electrodes, the elongated pores can be 5–20 microns in diameter and extend substantially across electrode layers of 0.2 to 5 millimeters thick. The elongated pores are arranged in generally parallel alignment with the electrode thickness at a distribution of about 5,000–50,000 per cm$^2$. Such elongated pores are obtained by thermal decomposition of commensurate fibrous flocking as is described below. The finer, interstitial porosity can exhibit pore sizes of about 0.5 to 1 micron diameter for retention and wetting by electrolyte. The total electrode porosity generally will be in the range of 40–70% of the electrode volume.

The electrolyte matrix 16 is prepared by conventional techniques, for instance, the tape casting method described in U.S. Pat. No. 4,411,968 cited above. Inert ceramic material such as powdered lithium aluminate, strontium titanate, etc. can be employed in preparing matrices for molten alkali metal carbonate electrolytes. Typically, electrolytes of $Li_2CO_3$ and $K_2CO_3$ are selected.

In a preferred mode of preparing the electrodes in accordance with the invention, particulate electrode catalyst is dispersed in a volatile organic or aqueous solvent to form a slip for tape casting. The slip also can contain an organic, or water soluble binder with a plasticizer adapted to decompose at elevated temperatures. Such a system can provide stability in the green tape prior to the final consolidation of the catalytic layer.

The slip is deposited as a tape into the flocking of a heat-consumable substrate layer. Conventional tape casting techniques can be used. For instance, the substrate can be made to pass beneath a wide mouth dispenser of slip with a suitably positioned doctor blade for regulating initial tape thickness.

It will be understood that various other techniques also can be used to deposit the catalyst into the substrate flocking. The catalyst can be introduced to the flocking as a powder, a paste or in liquid solution for subsequent transformation into a porous catalytic layer for electrode use.

The substrate for containing the catalyst is heatconsumable organic material having flocking on at least one major surface. Commercially available flocked layers such as those marketed for use in works of art, in surfaces of containers for fine jewelry or for delicate instruments can be adapted for use in the present invention. Flocked layers available from Winchester Corporation, Littleton Mass. with tradename ASTROFIBERS, on various substrates are contemplated for use.

A preferred flocked surface is prepared by applying an adhesive to a decomposable or burnable substrate layer. Previously prepared fibers of predetermined length are introduced to the adhesive coated surface under the influence of an electric field or by other means such as a blower to align the fibers generally normal to the substrate surface.

Although the substrate layer, the flocking and the adhesive may each be of a different material, it is of importance that each be thermally consumable that is decomposable or burnable to leave only a catalytic layer without extraneous residue after final processing. Adhesives having metal or metal compound constituents may be unsuitable for use due to the risk of catalyst poisoning or diminished activity resulting from residual metal. Substrates, flocking fibers and adhesives can be selected from thermally consumable materials such as nylons, polyester, cellulose, acetates, rayon and cotton. Specific examples of suitable substrate and flocking materials include paper, nylon or acetate backing and cotton, nylon or rayon fibers, while adhesives of epoxies, acrylics, or urethanes that leave no residue can be used.

The substrate with catalyst contained in its flocked surface is heated to a first temperature (e.g. about 200°–250° C.) sufficient to drive off the solvent and set the binder. This provides a green product that can be conveniently handled, cut or assembled into a furnace or cell structure. Additional heating is preformed to a second higher temperature (e.g. about 300°–400° C.) to drive off the heat-consumable materials in the substrate, flocking, adhesive and binder to obtain the elongated pores across the electrode layers described above.

Both the first and the second processing temperatures are well below the melting temperature of the electrode catalyst material. A final heating step is performed to a third temperature sufficiently high to sinter bond the catalyst material into a porous layer suitable for electrode use. Temperatures of between 800°–1800° C. typically are needed to sinter the catalyst contemplated for use in the method of this invention.

The catalyst layer thus produced will exhibit a relatively large porosity of elongated pores extending substantially across the thickness thereof and a smaller size porosity exhibited in the interstitials between the catalyst particles. The pore sizes as indicated above have been observed and found suitable for gas distribution while retaining molten electrolyte in wetted contact with the catalyst particles. For this purpose catalyst particles in the size range of 0.1 to 1.0 microns can be used in forming the electrode catalytic layers.

In one manner of enhancing the lateral flow of reactant gases in the electrodes, the catalytic particles can be agglomerated into fibrous pieces prior to the tape casting step. The original fine catalytic particles of 0.1 to 1.0 microns can be dispersed in a highly volatile solvent such as acetone with a suitable binder such as a TAM Ceramic acrylic binder or a Rohm and Hass thermosetting resin. The dispersion can be extruded through small apertures by centrifugal force as the solvent vaporizes to form green fibers. Sintering is performed at a lower temperature than that to be used later in sintering the green electrode. For instance, the fibers can be sintered at about 1000° C. or less with subsequent electrode sintering at about 1200° C. The resulting fibers can be broken into elongated pieces of about 5–15 microns diameter and 20–100 microns length for use as catalytic particles in the tape casting slip described above. The elongated fiber pieces, consolidated into the electrode structure provide an enhanced network of lateral openings for reactant gas flow throughout the electrode.

Electrode materials or catalysts for molten carbonate fuel cell cathodes preferably are selected from nickel oxide (NiO) lithium ferrate ($LiFeO_2$) and lithium manganate ($Li_2MnO_3$). Suitable dopant metals such as lithium, magnesium and manganese are included in minor proportions to impart conductivity to the cathodes. Other cathode materials and methods of preparation are more fully described in U.S. Pat. No. 4,564,567 cited above and incorporated by reference herein for such description and disclosure.

Anode materials or catalysts can be selected from suitable metals such as nickel, nickel-copper and nickel-chromium mixtures or alloys. Such anodes and their methods of preparation are described in U.S. Pat. No. 4,404,267 to Iacovangelo et al., incorporated by reference herein.

EXAMPLE

A cathode was made using about 1.8 g $LiFeO_2$ powder, about 4 g rice starch, about 0.1 g fish oil, and about 1.4 g TAM 73131 acrylic binder. This mixture was diluted with a butanol-xylene mixture (22/78 by volume butanol/xylene). Astro flock on a non-woven backing, made by Winchester Corp., Littletone, Mass., was filled by successively saturating the flock and drying. The material was then heated to about 400° C. and held for about 2 hours to drive off the consumable backing, flocking and binder. Sintering was then conducted at about 1100° C. to consolidate the cathode structure.

The present invention is described and illustrated with specific materials, structure and process steps. It is to be understood that many variations will occur to those skilled in the art within the scope of the following claims.

The embodiments of this invention in which an exclusive property or priviledge is claimed are defined as follows:

1. A method of forming a porous catalytic layer having elongated pores in general alignment along the thickness thereof for use as an electrode in a molten carbonate fuel cell comprising:
providing a substrate of heat consumable material with flocking on an exposed surface thereof, said flocking comprising, fibers of about 5-20 microns diameter, 0.2-5 millimeters length and at a distribution of about 5,000-50,000 per $cm^2$ aligned generally normal to the substrate surface;
depositing particulate catalyst of no more than 100 microns particle size into the flocking on the substrate;
heating the substrate with catalyst to consume the flocking a sintering, thereby leaving a porous catalytic layer with elongated pores in general alignment along the thickness thereof.

2. The method of claim 1 wherein the flocking on the substrate is formed by applying an adhesive to a substrate layer and applying flocking fibers to the adhesive in a generally normal alignment to the substrate.

3. The method of claim 2 wherein the flocking, substrate and the adhesive each consist essentially of heat-consumable organic material and leave essentially no solid residue to the porous catalytic layer following said heating step.

4. The method of claim 2 wherein the flocking and the substrate are composed of a material selected from the group of organic materials consisting of nylon, polyesters, cellulose, acetates, and cotton.

5. The method of claim 2 wherein the substrate, adhesive and the flocking are each of a different material but each having a thermal decomposition temperature less than the melting temperature of the catalyst.

6. The method of claim 1 wherein heating is conducted to a temperature in excess of 200° C. but below the catalyst melting or decomposition temperature to consume the substrate with flocking leaving substantially no solid residue.

7. The method of claim 1 wherien the particulate catalyst is dispersed into a volatile liquid forming a slip and the slip is cast as a tape into the substrate flocking.

8. The method of claim 7 wherein a heat consumable binder and plasticizer are included in the slip for tape casting and the binder and plasticizer consumed during the heating step leaving substantially no solid residue.

9. The method of claim 7 wherein the substrate and flocking with tape cast catalyst is heated to a first temperature sufficient to vaporize the slip liquid setting the tape with catalyst, to a second temperature sufficient to consume the substrate with flocking and to a third temperature sufficient to sinter the catalyst into an intergal layer with elongated pores generally aligned along the thickness thereof.

10. The method of claim 1 including the additional steps of dispersing catalytic particles of 0.1 to 1.0 microns in a liquid solvent with a binder; extruding the dispersion and vaporizing the solvent to form green fibers; sintering the green fibers at not more than about 1,000° C.; breaking the sintered fibers into elongated pieces of 5–15 microns diameter and 20–100 microns length; dispersing the broken fibers into a liquid slip and tape casting the slip with fibers into the flocking, thereby depositing said particulate catalyst into said flocking.

11. A method for forming an electrode for use in a molten carbonate fuel cell comprising;
horizontally positioning a heat-consumable substrate having fiberous flocking on the upper surface thereof, the fibers being in general vertical alignment;
preparing a slip of particulate catalyst in carrier liquid;
casting the slip as a tape into the substrate flocking;
heating the substrate with cast tape to a first temperature to set the tape, to a second temperature to consume the substrate and flocking and to a third temperature to sinter bond the particulate catalyst into a porous catalytic layer having elongated pores in general alignment along the layer thickness and having fine, random distributed pores among the catalytic particles.

12. The method of claim 11 wherein the slip includes a heat-consumable binder and plasticizer which are driven off during the heating step.

13. The method of claim 11 wherein the elongated pores have diameters of about 5-20 microns and length substantially across the catalyst layer thickness.

* * * * *